DETECTION OF DATA PROCESSING ERRORS
Filed March 29, 1963
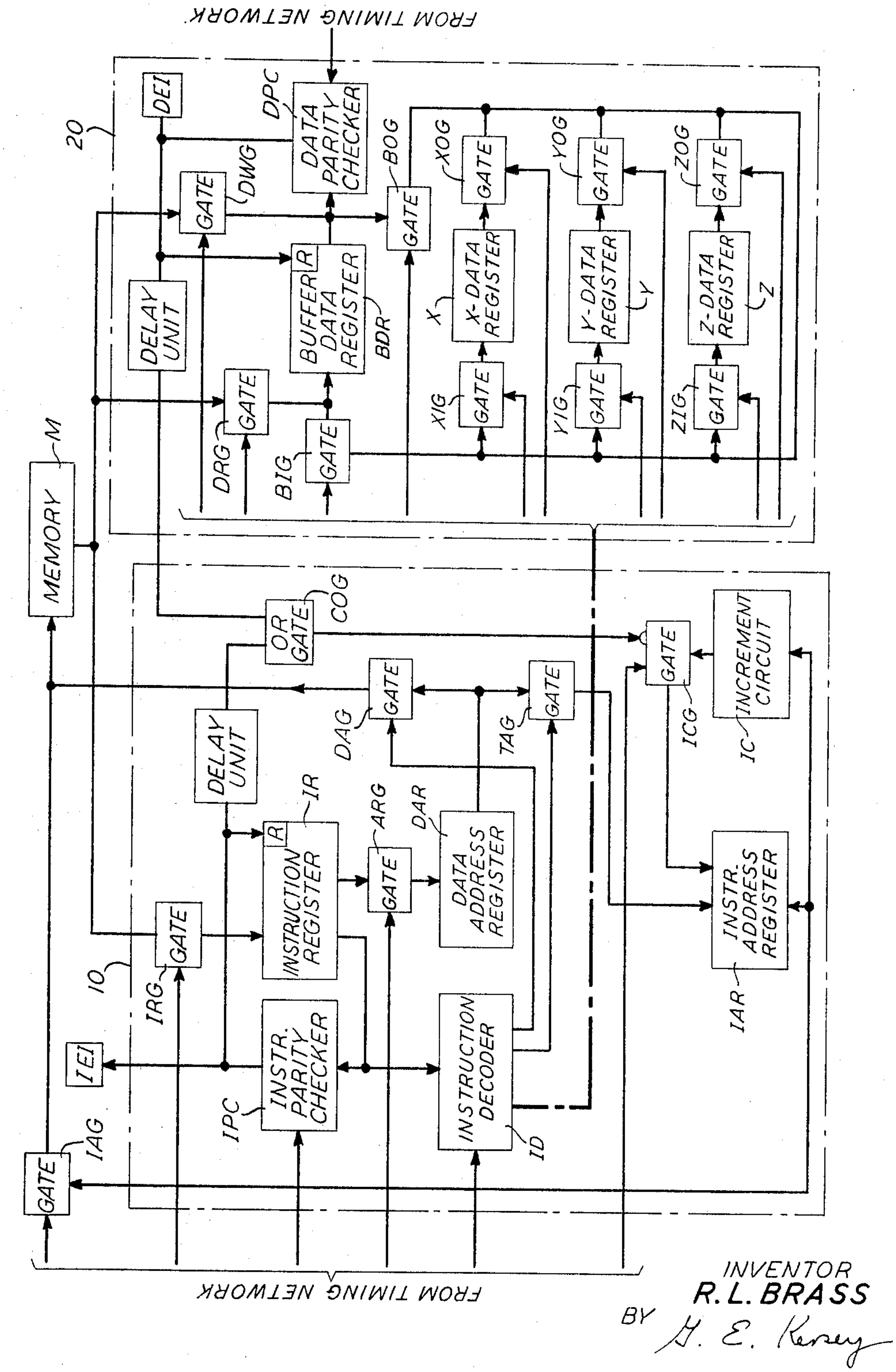
INVENTOR
R. L. BRASS
BY G. E. Kersey
ATTORNEY 3,283,302
DETECTION OF DATA PROCESSING ERRORS
Robert L. Brass, Colts Neck, N.J., assignor to Bell Telephone Laboratories, Incorporated, New York, N.Y., a corporation of New York
Filed Mar. 29, 1963, Ser. No. 269,106
6 Claims. (Cl. 340—146.1)

This invention relates to the processing of data by program, and more particularly to the detection of errors during processing.

A program is a set of instructions for carrying out preassigned operations on data. In a machine sense these operations involve various code signals representing the instructions and the data. Typically, the signals correspond to binary integers or "bits" and individually admit of one of two possible values.

Although errors in the signals are inevitable during processing, their effects can be mitigated by error-detecting and error-correcting techniques. For one such technique, so-called check signals supplement those originally generated.

In general, any number of errors in a group of binary signals can be detected and/or corrected if the group is appropriately constituted of a subgroup of $k$ check signals and another subgroup of $n$ information signals.

For the detection of a single error in a code-word group, a single check signal suffices. Consider the example of a code constituted of words 001, 010, 100 and 101. The right-most element of each word is a check bit, while the remaining elements are information bits. It is to be noted that the check bit has been chosen to achieve "odd parity" by making the total number of "1's" in each group odd. On the other hand, the check bit can be chosen for "even parity" to make the total number of "1's" in each group even.

Although satisfactory for errors in individual code signals, error-detecting and correcting techniques are not able to deal with all categories of data processing errors.

To make data and the instructions of a program available as required, they are variously entered into and extracted from a memory used to store them. The locations in the memory of data and instructions are given by respective addresses. Typically, the addresses of data are contained within, or derived from, instructions which, together with distinctive addresses of their own, constitute the steps of the program. Where both the instructions and the data are obtained from the same memory unit, an error in the extraction of information from the memory can lead to the misinterpretation of an instruction as an item of data or vice versa. When this occurs the ensuing execution of a program can become seriously in error, particularly if the error occurs in an instruction.

Such is the case, for example, with a "transfer" instruction. Many addresses of instructions are assigned sequentially to the steps of a program. However for operations with varying degrees of recurrence, storage is saved by assigning to each a single subset, or subroutine, of entries in the memory.

Whenever the program proceeds to a point where another subset is required, a transfer is made to it. The transfer is accomplished by the inclusion, with each subset, of an instruction which contains the location in the memory of the first instruction in a new subset. If an error occurs in a transfer, i.e., if the information to which a transfer is made is other than an instruction dictated by the program, the ensuing instructions will form incorrect sequences even though individually they may be either free from error or correctable.

Accordingly, it is an object of the invention to provide for the detection of errors that are ordinarily beyond the normal scope of error-correcting and detecting codes. A related object is to prevent the misinterpretation of code words extracted from a memory that is used to store code words of diverse categories, for example, data and instructions.

In accomplishing the foregoing and related objects, signals of diverse classes but of similar form are encoded so that all members of each class have a distinctive, error-sensitive characteristic. As a result, such signals, including those having a common origin, can be monitored for error, and, in addition, can be selectively identified according to characteristic to prevent misinterpretation as to class.

Specifically, in a data processing system where signals representing both data and instructions originate in the same memory unit, the codes for data have one kind of preassigned, error-sensitive characteristic in common and the codes for instructions have another kind. Thus, for example, a check signal producing one kind of parity, either odd or even, is associated with the class of signals corresponding to selected instructions, and a check signal producing the complementary kind of parity is associated with the class of signals corresponding to selected data. Of course, the diverse classes of signals may be associated with the data or the instructions, taken alone, or in any preassigned combination.

Upon being extracted from the memory unit, the signals are evaluated for their preassigned characteristics to identify them as either data or instructions. Where the common characteristic is achieved using a single check signal, respective parity checks of extracted instructions and data signals indicate that each group of associated signals either has been correctly extracted or contains no single error.

It is a feature of the invention that, on the occurrence of error, regardless of category, a re-extraction can be undertaken of signals found to be in error. In data processing, each failure of a preassigned characteristic results in the re-addressing of a memory unit containing both data and instruction signals.

It is a further feature of the invention that the use of respective preassigned characteristics for the data and instruction signals, coupled with their origination in a common memory unit, allows the assignments of locations in the memory unit to assure that a proper transfer is made from one subset of instructions to another.

Other aspects of the invention will become apparent after considering an illustrative embodiment taken in conjunction with the figure, which is a block diagram of a data processing system.

As shown in the figure, a Memory M operating through a group 10 of instruction units, serves as a source of instructions which are executed by a group 20 of data units that act upon data also obtained from the Memory M. Both the Memory and the various constituent gates, registers, and decoders of the instruction and data groups 10 and 20 of the figure are of standard design.

Before an instruction can be executed, it must be taken out of storage. This is done by an Instruction Address Register IAR whose coded output gives the location of the instruction in the Memory. After the code signals, forming the address, are gated in parallel through an Instruction Address Gate IAG to the Memory, the associated instruction passes through an Instruction Register Gate IRG into an Instruction Register IR. Both Gates IAG and IRG are enable from a timing network (not shown) of conventional construction.

The registered instruction can have two parts—a portion containing the coded command of the instruction and a portion containing the coded address of either a data or an instruction word. The former is decoded by an Instruction Decoder ID; the latter, when a data word, enters a Data Address Register DAR through an Address Register Gate ARG. Both the Decoder ID and the Address Register Gate ARG are operated by the timing network.

Subsequently, the Decoder can make the data address in the Data Address Register DAR available to the Memory by operating a Data Address Gate DAG. The data address gives the location or destination in the Memory of the data to be acted upon in accordance with the dictates of the instruction.

To complete the carrying out of a step of a program, the Decoder operates various Gates associated with the Registers of the data group 20. One Register, the Buffer Data Register BDR, serves as a buffer for the Memory and three other registers, X, Y and Z, variously receive data either arriving from the Memory or destined for it. The specific operation of the Gates is determined by whether the instruction dictates that the data be dispatched from the Memory to one of the Data Registers or vice versa.

When the data are sent to the Memory, i.e., "written" in it, the Decoder operates a Data Writing Gate DWG and a Buffer Register Input Gate BIG, along with one of the output gates XOG, YOG, or ZOG, according to the instruction being executed. Conversely, when data are "read" from the Memory, the Decoder operates a Data Reading Gate DRG and a Buffer Register Output Gate BOG, along with one of the input gates XIG, YIG, or ZIG, according to the instruction.

Where the steps of the program follow in sequence, each succeeding address at the output of the Instruction Address Register IAR is obtained by augmenting its predecessor by unity through the operation of a standard Increment Circuit IC. However, when a transfer is to take place, the address indicated by the Instruction Address Register must be modified to accord with the locatilon in the Memory of the first instruction to which a transfer is to be made. This modification is carried out by gating the contents of the Data Address Register, containing the transfer address, through the Transfer Address Gate TAG into the Instruction Address Register.

The constituents of the data processing system thus far discussed permit the extraction of data and instructions from the Memory in accordance with the dictates of the program. It is evident that if a group of signals entering the Instruction Register IR represents a data word rather than an instruction word, the ensuing operation of the system will be seriously in error. Similarly, an unscheduled entry of instruction signals into a Data Register is also undersirable.

However, in accordance with the invention, provision is made not only for detecting the erroneous extraction of information signals from the Memory but also for indicating the occurrence of error in signals that have been correctly extracted. Illustratively, this is accomplished by giving the instructions and data distinctive parity characteristics, and by employing an Instruction Parity Checker IPC and a Data Parity Checker DPC at the respective outputs of the Instruction and Data Registers IR and BDR.

The groups of code signals monitored by the Parity Checkers contain supplemental parity check signals which render the number of like integers in each data or instruction word odd or even. Illustratively, the instructions have even parity and the data odd parity. Thus a subgroup of binary integers, for example, 1101, representing an instruction, is supplemented by a single "1," making the group 11011 so that it contains an even number of "1's." On the other hand, if this same subgroup 1101 represents an item of data, the check bit is a "0" making the entire group 11010 so that it contains an odd number of "1's." Apparatus for parity encoding is well known in the art and is used to appropriately supplement the code signals stored in the Memory.

As long as parity is satisfied, the Memory continues to be addressed according to schedule. When there is a parity failure at either Parity Checker, Instruction and Data Error Indicators IEI and DEI respond accordingly. In addition, an appropriately delayed control signal from one of the Parity Checkers acts through a Control OR Gate COG to inhibit the Increment Circuit Gate ICG. This prevents the output of the Address Register from changing and allows the re-extraction of information signals from the Memory during the next cycle of operation. In the event of excessively repeated mis-extractions, a maintenance operation (not illustrated) is enacted.

The operation of the data processing system in accordance with the invention can be better understood by considering a representative program given in Tables I and II.

*Table I.—Data processing program*

| Step of Program | Step of Subset | Address of Instruction | Data Processing Instruction | |
|---|---|---|---|---|
| | | | Command | Address |
| 1 | 1-A | 100 | MX | 140 |
| 2 | 2-A | 101 | MY | 141 |
| 3 | 3-A | 102 | XM | 142 |
| 4 | | 103 | T | 200 |
| 5 | 1-T | 200 | MZ | 145 |
| 6 | 2-T | 201 | ZM | 146 |

*Table II.—Code words associated with Table I*

INSTRUCTION CODE WORDS

| Step of Program | Command | Address | Parity Bit |
|---|---|---|---|
| 1 | 0001 | 10001100 | 1 |
| 2 | 0010 | 10001101 | 0 |
| 3 | 0011 | 10001110 | 1 |
| 4 | 1000 | 11001000 | 1 |
| 5 | 0110 | 10010001 | 0 |
| 6 | 0111 | 10010010 | 1 |

DATA CODE WORDS

| | Data Item | Parity Bit |
|---|---|---|
| 1 | 100110000001 | 0 |
| 2 | 010000000111 | 0 |
| 3 | 110110110111 | 1 |
| 4 | 011010010001 | 1 |
| 5 | 100100100100 | 0 |
| 6 | 100101001001 | 1 |

Both the instructions and their addresses in Table I are written in alpha-numeric form. However, the processing equipment itself operates in response to signals coded in binary form. Hence, the upper portion of Table II shows the code counterparts of the instructions of Table I as supplemented by check bits which provided each instruction with even parity. In addition, the lower portion of Table II shows the code counterparts of hypothetical items of data being processed by the program of Table I, supplemented by check signals giving the data even parity. It is to be noted in Table I that there is a gap between the addresses of instructions of the subset A from which a transfer is made and those of the subset T to which a transfer is made.

Turning to the specific program of Table I, it is of use where items of information previously entered into the Memory are to be repositioned at other Memory locations, which are associated with a particular subset forming a part of the program.

The designation of each command is chosen to give an indication of the data processing operation directed by it. Thus, the designation MX indicates that data from the Memory are to be entered into the X Register; conversely, XM concerns the placing of X Register data in the Memory. Similarly, T designates a transfer instruction.

Each step of the program contains the address of an instruction in the Program Store, as well as the instruction. For example, step 1 of the program contains the address 100 of the instruction MX 140. The latter, in turn, consists of a prefix or command portion MX and an address portion 140 giving the location in the Memory of data subject to the command. It is to be noted that all of the commands set forth in the Tables involve transmission only to or from the Memory. In general, the execution of certain commands may not involve the Memory, in which case the commands are unaccompanied by data address portions.

Ordinarily, the instructions set forth in Table I would be included somewhere in the midst of a program. For simplicity, it will be assumed that the first instruction of Table I is associated with the first step of the program. Then, for the first cycle of operation, the address at the output of the Instruction Address Register IAR is 100, as dictated by step 1 of the program. During this cycle, the Memory is addressed at location 100 through Instruction Address Gate IAG and instruction MX 140 enters the Instruction Register as a result of the operation of the Instruction Register Gate IRG. Consequently, during this cycle, the address portion 140 of the instruction in the Preliminary Register is made available to the Data Address Register through an Address Register Gate ARG. Ordinarily, the address in the data Address Register is processed by a so-called index adder which modifies it. Such an index adder has been omitted since its inclusion would add complexity to the system without contributing to an explanation of the invention.

During the second cycle of step 1, the Memory is addressed through the Data Address Gate DAG, which is operated as a result of the Decoder response to the prefix portion MX of the instruction. Since the prefix MX indicates that data are to be "read" from the Memory and sent to the X Register, the Decoder also operates the Data Reading Gate DRG, the Buffer Register Output Gate BOG, and the X Register Input Gate XIG. As a result, there is a through path for the data from the Data Store to the X Register by way of the Buffer Data Register.

Similar operations to those described above, except for operation of the Data Writing Gate DWG during "writing" for prefix YM, take place during the operating cycles of the ensuing program steps. During the fifth step, the transfer instruction T arrives at the Instruction Register. Unlike the other instructions, the address of the transfer instruction is not destined for the Memory. Instead of operating either the Data Address Gate or the Increment Circuit Gate, the code associated with the transfer instruction acts upon the Transfer Address Gate TAG, causing the Transfer Address to substitute for the address that would otherwise appear at the output of the Program Address Register.

Following step 4, the Memory is addressed at location 200, so that the Instruction Register IR is entered by instruction MZ 145. The latter is the first instruction of a transferee subset and is not associated with a numbered step of the program since it ordinarily appears with a step of the program preceding that from which the transfer has been made.

Upon completed execution of the instructons in the transferee subset, a transfer can be effected to another transferee subset, or to a step of the main program.

In the event of error, rising either from the mis-extraction of information from the Memory or from an internal error in correctly extracted information, one of the Parity Checkers IPC or DPC will respond, reset its associated Register, and cause the program step to be repeated on the next cycle of operation. Successful re-extraction re-establishes the normal sequence of operation. For example, during program step 4, the transfer instruction word 100011001000 should enter the Instruction Register. However, if the Memory has been incorrectly addressed and a data word is erroneously in the Register, the Instruction Parity Checker will detect a parity failure since the total number of "1's" in the word obtained from the Memory will be odd rather than even. As a result, the Instruction Error Indicator will be operated, the Instruction Register will be re-set and a pulse signal will inhibit the Increment Circuit Gate. Consequently, the transfer address will not enter the Program Address Register and the transfer step will be repeated in the manner previously described. A similar kind of action occurs when a parity failure takes place at the Data Parity Checker.

Numerous adaptations of the invention, along with other instrumentational settings, will occur to those skilled in the art.

What is claimed is:

1. Apparatus for detecting errors in the processing of data and instruction signals which comprises a memory for storing the instruction signals encoded for a first kind of parity and the data signals encoded for a second kind of parity, means connected to said memory for selectively extracting the coded information and data signals therefrom, a first register connected to said memory for the extracted instruction signals, a second register connected to said memory for the extracted data signals, first means connected to said first register for checking the signals therein for said first kind of parity, and second means connected to said second register for checking the signals therein for said second kind of parity.

2. Apparatus as defined in claim 1 further including means responsive to the first and second means for checking parity for initiating a re-extraction of the signals from said memory when the signals checked by said means for checking parity evidence disparity.

3. Apparatus for detecting data processing errors comprising means for storing groups of signals, each group thereof being a member of a single one of two distinctive classes and encoded with a distinctive kind of parity according to its particular class, means for initiating the selective extraction of groups of said signals from said storing means according to class, means for consigning to a first register each group of signals nominally belonging to the first class, means for consigning to a second register each group of signals nominally belonging to the second class, first means for checking each group of signals in said first register for parity of the first kind, and second means for checking each group of signals in said second register for parity of the second kind.

4. Apparatus comprising means for storing (1) signals of one class encoded with a first kind of parity, and (2) signals of a second class encoded with a second kind of parity, different from the first, means for extracting signals from the storing means, means for separately consigning the extracted signals according to class, and means for checking the distinctive parities of the signals thus consigned.

5. Apparatus comprising means for storing a first class of signals encoded with a first kind of parity and a separate, second class of signals encoded with a second kind of parity, means for selectively extracting said signals according to class, means for checking the extracted signals of said first class for said first kind of parity, and means for checking the extracted signals of said second class for said second kind of parity.

6. Apparatus for detecting data processing errors which comprises a memory for storing (1) groups of signals of a first class, each group including checking signals of a first kind, and (2) groups of signals of a second class, different from the first, each including checking signals of a second kind, means for extracting groups of the stored signals from said memory, first means for registering groups of extracted signals of said first class, second means for registering groups of extracted signals of said second class, means for checking the registered signals of said first class in accordance with said checking signals of said first kind, and means for checking the registered signals of said second class in accordance with said checking signals of said second kind.

References Cited by the Examiner

UNITED STATES PATENTS

| | | | |
|---|---|---|---|
| 3,193,800 | 7/1965 | Shoultes | 340—146.1 |
| 3,213,426 | 10/1965 | Melas | 340—146.1 |

MALCOLM A. MORRISON, *Primary Examiner.*

M. P. ALLEN, *Assistant Examiner.*

UNITED STATES PATENT OFFICE
CERTIFICATE OF CORRECTION

Patent No. 3,293,302 December 20, 1966

Ivan C. Popoff et al.

It is hereby certified that error appears in the above numbered patent requiring correction and that the said Letters Patent should read as corrected below.

Column 3, lines 14 to 17, the formula should appear as shown below instead of as in the patent:

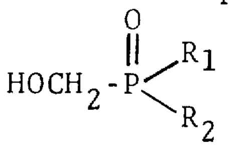

Signed and sealed this 12th day of September 1967.

(SEAL)
Attest:

ERNEST W. SWIDER
Attesting Officer

EDWARD J. BRENNER
Commissioner of Patents